United States Patent [19]

Franklin et al.

[11] 4,067,956
[45] Jan. 10, 1978

[54] RETICULATED ANISOTROPIC POROUS VITREOUS CARBON

[75] Inventors: Charles H. Franklin; Clarence S. Vinton, both of Ann Arbor; Henry C. Geen, Brooklyn, all of Mich.

[73] Assignee: Chemotronics International, Inc., Ann Arbor, Mich.

[21] Appl. No.: 730,830

[22] Filed: Oct. 8, 1976

[51] Int. Cl.$^2$ .................... C01B 31/00; C01B 31/02
[52] U.S. Cl. .................... 423/445; 264/29.1; 423/449
[58] Field of Search ............. 423/445, 449; 264/29.1

[56] References Cited

U.S. PATENT DOCUMENTS

| | | | |
|---|---|---|---|
| 3,325,338 | 6/1967 | Geen | 260/2.5 BD |
| 3,446,593 | 5/1969 | Moutaud | 423/449 X |
| 3,859,421 | 1/1975 | Hucke | 423/445 |
| 3,922,334 | 11/1975 | Marek et al. | 423/445 |
| 3,927,186 | 12/1975 | Vinton et al. | 423/445 X |

Primary Examiner—Edward J. Meros
Attorney, Agent, or Firm—Ian C. McLeod

[57] ABSTRACT

A reticulated anisotropic porous carbon structure composed of bent or crimped interconnected and continuous strands is described. The structure is isomorphic with the compression bent strands of the flexible reticulated polyurethane structure from which it is derived. The structure compression can be sufficient for interbonding of the bent strands which overlay each other or the bent strands can be essentially free of bonding to adjacent strands. The carbon structure is derived by providing a compressed reticulated anisotropic polyurethane structure composed of the bent strands which is then infused with a liquid thermosetting resin or resin solution or resin precursor, removing any excess liquid resin or resin precursor or resin solution from the surfaces of the strands; and then carbonizing the infused strands at an elevated temperature. The reticulated carbon structures so formed are relatively unreactive, even at very high temperatures, under reducing or neutral conditions and are particularly useful as corrosive and high temperature material filters, battery electrodes, porous catalysts or catalyst supports as well as for making carbide containing articles by infusion of the pores with a carbide forming metal or cladding thereof such as with carbide or nitride coatings by chemical vapor deposition and the like.

14 Claims, 5 Drawing Figures

COMPRESSED PARTIALLY

INTERBONDED STRAND

CARBON STRUCTURE

COMPRESSED INTERBONDED STRAND CARBON STRUCTURE

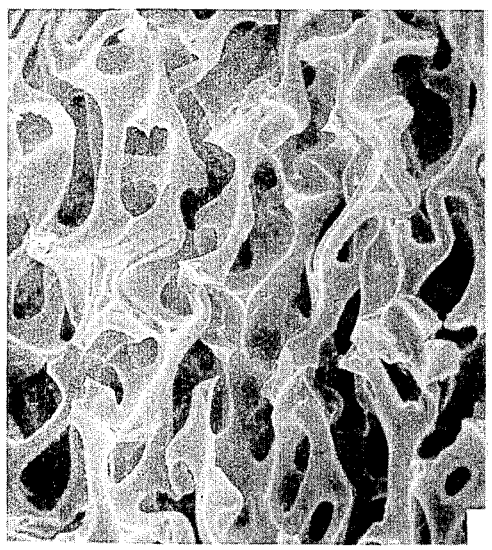
COMPRESSED PARTIALLY
INTERBONDED STRAND
CARBON STRUCTURE
FIG. 3
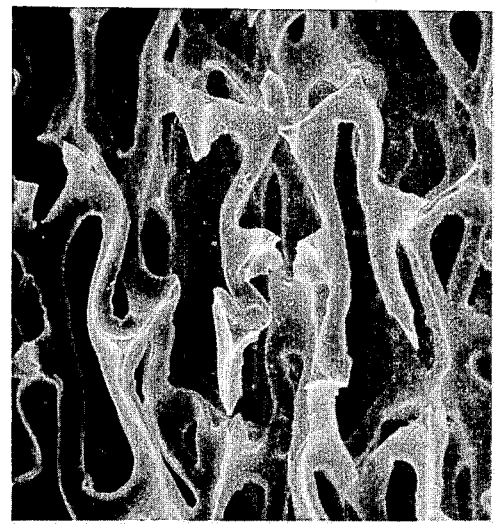
COMPRESSED CARBON STRUCTURE
OF EXAMPLE III
FIG. 4
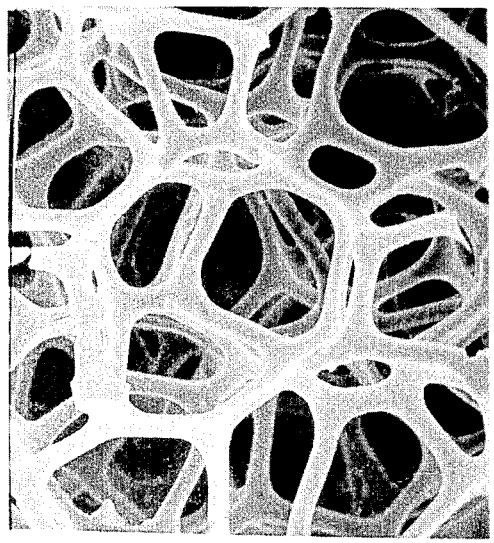
COMPARATIVE RETICULATE
CARBON STRUCTURE FIG. 5

RETICULATED ANISOTROPIC POROUS VITREOUS CARBON

SUMMARY OF THE INVENTION

The present invention relates to porous reticulated anisotropic carbon structures. In particular, the present invention relates to carbon structures which are derived by carbonization of compression bent or crimped strands of a reticulated anisotropic porous polyurethane structure which is infused or alloyed with a thermosetting resin or resin precursor or resin solution.

PRIOR ART

The specification of U.S. Pat. No. 3,859,421 (423/445) to Hucke described much of the prior art in the preparation of non-reticulated microporous carbon structures in a variety of porosities. We are unaware of any prior art in compressed reticulated anisotropic porous carbon structures. As can be seen, there is great variation in the porosity and structure between the reticulated and non-reticulated carbon products. The invention in this patent relates to microporous carbon structures which are formed by heating a mixture of a carbon forming binder, a liquid pore former and a dispersing agent. The liquid pore former is volatilized during carbonization to leave the pores. The mean pore diameters of these structures are about 200 microns ($5.08 \times 10^{-4}$ cm) or less which for some applications are too small.

A number of the prior art carbon structures are prepared by foaming a liquid thermosetting resin or resin precursor with or without a liquid polyurethane resin precursor to aid in foaming. In such foaming operations there are membranes forming the cell walls of the cellular foams. The membranes are a necessary adjunct to the foaming operation since the expanding gas forms and supports the foam at least until the structure gels, as is well known to those skilled in the art. Usually there are some breaks or interconnections in the membranes between cells which allow gas passage but fluid flow through the foam is greatly restricted by the membranous portions of each cell. The structures are then carbonized in the conventional manner.

U.S. Pat. No. 3,927,186, which is assigned to a common assignee with the present application describes reticulated isotropic carbon structures prepared by heating of liquid furan resin or furan resin precursor infused reticulated polyurethane structures. These isotropic polyurethane reticulated structures are characterized by the lack of membranes between smooth strands (as can be seen from FIG. 4), and by the absence of a cellular structure. These structures have a mean spacing of the pores between the strands which is between about 0.03 and 0.25 cm (which corresponds to reticulated structures having between about 100 and 10 pores per inch (ppi) as measured by standard air flow methods). The problem is that for some filtering, catalyst support and electrode applications these strand spacing are much too large and the structure is mechanically not strong enough. There is a need for relatively mechanically strong intermediate and anisotropic reduced pore size carbon products, which have smooth pores or openings and which have passages unobstructed such as by membranes, which is not met by the unreticulated isotropic small pored structures described by Hucke.

OBJECTS

It is therefore an object of the present invention to provide an anisotropic reticulated porous carbon product which has a porosity which is substantially less and mechanical strength substantially greater in at least one direction than that of isotropic reticulated carbon structures and yet has pores which are unobstructed by membranes. Further it is an object of the present invention to provide a method by which such structures can be rapidly and economically produced. These and other objects will become increasingly apparent by reference to the following description and to the drawings.

IN THE DRAWINGS

FIG. 3 is a 100 times scanning electron micrograph of a thin cross-section of the anisotropic reticulated bent strand carbon structures of the present invention where the bent strands are interbonded to a lesser extent due to a 3:1 compression.

FIG. 4 is a 100 times scanning electron micrograph of the anisotropic reticulated carbon product due to a 3.2:1 compression of a liquid thermosetting resin infused isotropic structure which is compressed while the thermosetting resin is liquid and where the bent strands are essentially not interbonded, in contrast to FIG. 3.

FIG. 5 is a 100 times scanning electron micrograph of a thin cross-section of an isotropic reticulate carbon structure of U.S. Pat. No. 3,927,186 for comparative purposes showing the unbent carbon strands.

GENERAL DESCRIPTION

The present invention relates to anisotropic reticulated carbon structures comprised of interconnected and continuous bent strands of carbon in the isomorphic form of compressed flexible reticulated polyurethane structures from which they were derived. In particular, the present invention relates to a crack-free, reticulated anisotropic bent strand carbon structure which is derived from and which reproduces upon carbonization the isomorphic form of a compressed reticulated flexible polyurethane structure without cell membranes which has been infused with a liquid thermosetting resin or resin precursor or resin solution in a solvent which alloys with the polyurethane structure and wherein the structure is substantially free of a non-alloyed surface coating of the resin or resin solution or resin precursor prior to carbonization. The term "isomorphic form" as used herein means that the structure is in the image of and is a duplicate of the geometry and shape of the compressed reticulated polyurethane structure from which it was derived although it can be proportionally changed in size due to shrinkage caused by carbonization.

Figure 1:
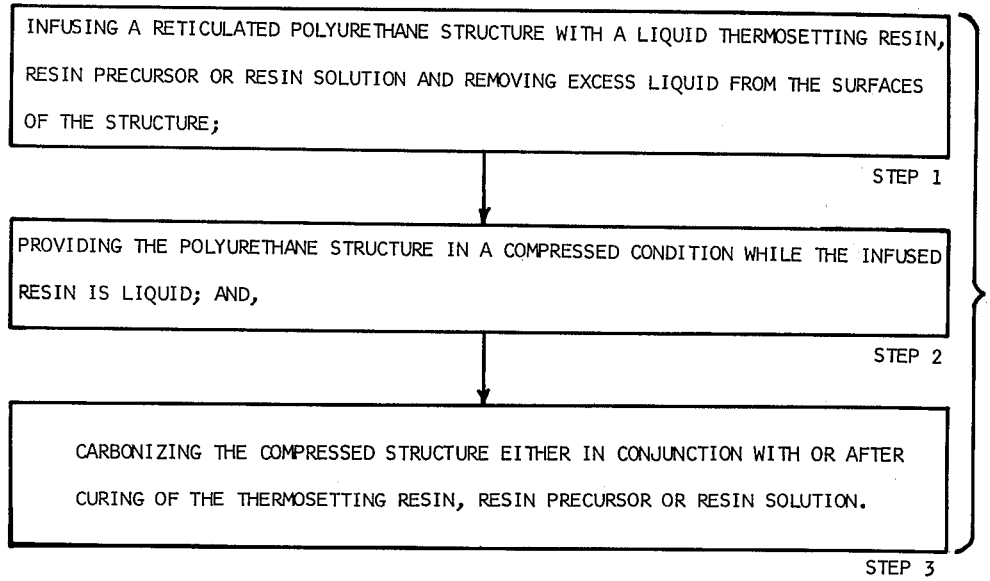
FIG. 1 is a schematic diagram of the steps of a preferred method of the present invention.

The preferred method steps are as generally set forth in FIG. 1 and include wet compressing the reticulated polyurethane structure which has been infused with the liquid thermosetting resin or resin solution or resin precursor and which has had the excess liquid removed; and carbonizing the compressed structure either in conjunction with or after curing of the thermosetting resin.

It is easier in the preferred method to infuse the uncompressed flexible reticulate polyurethane structures with the liquid resin or resin solution or resin precursor, remove the excess liquid and then compress and carbonize them. The infused structures can be cured and carbonized in a single step which saves time.

The alternative to compressing the infused reticulate structure and carbonizing is to pre-compress and set or compression interbond the strands of a non-infused isotropic reticulate polyurethane structure and to then infuse that compressed anisotropic structure. U.S. Pat. No. 3,325,338 to Geen describes the preparation of flexible reticulated polyurethane structures from compressed and heat interbonded strands of flexible polyurethane reticulate structures. The uncompressed reticulate structures used as a starting material are without cell membranes and can be heat treated preferably by the method of U.S. Pat. No. 3,175,025 to Geen and Rice wherein an interconnected cell flexible polyurethane form with membranes is confined in a closed space and then filled with a combustible gas which is then ignited to destroy the cell membranes and thus form a non-cellular reticulate structure. These reticulated compressed interbonded stand products can be used as starting materials for the present invention and can be infused with the thermosetting resin or resin precursor or resin solution. Even though the strands are not interbonded, the reticulate structures can be compression set by heating in the manner shown in U.S. Pat. No. 3,025,200 to Powers and these also are suitable as starting materials for the present invention. In the present method the compression and setting is usually, but not necessarily, more than about 50% (2:1) of the original reticulate structure dimension in at least one direction. As will be seen, the procedure with the pre-compressed structure is more difficult where the compression ratio is large because of the difficulty in infusing and removing excess liquid resin or resin precursor or resin solution.

There are various sources for the reticulate structures. U.S. Pat. Nos. 3,890,254 to Guthrie and 3,884,848 to Ricciardi et al describe reticulated structures which are usually referred to as being "self-reticulated". U.S. Pat. No. 3,171,820 to Voltz describes hydrolysis reticulated polyurethane structures. Various mechanical methods using air or liquids are known for membrane removal. These structures, or the preferred structures of U.S. Pat. No. 3,175,025, can be used as starting materials for the method of the present invention.

As indicated, the extent of compression of the reticulate polyurethane structure before or after infusion with the thermosetting resin or resin solution or resin precursor is usually at least 50 percent (2:1) of its dimension in at least one plane. This compression is substantial and produces a significant anisotropy in the resulting carbon products. The induced anisotropy produces significantly improved mechanical strength in at least one dimension and unexpectedly increases the electrical conductivity disproportionately as compared to the isotropic comparable uncompressed reticulate carbon structure. Compression can be achieved by the usual means, particularly linearly, using heated platens such as disclosed in U.S. Pat. No. 3,325,338 to Geen.

In U.S. Pat. No. 3,927,186, is described a method for the rapid carbonization of furan resin or resin precursor impregnated polyurethane strands by the removal of unalloyed or non-infused excess furan resin or resin precursor from the surfaces of the strand prior to carbonization. This rapid carbonization method also can be utilized in preparing the reticulated anisotropic carbon products of the present invention. One important step in the method of U.S. Pat. No. 3,927,186 is to make sure that excess unalloyed or non-infused resin is not present on the surfaces of the strands of the infused polyurethane reticulate structure, since this step permits rapid carbonization. This removal step is important regardless of the length of time of carbonization in producing the products of the present invention because of the reduced pore size of the compressed reticulate structures. As a result of the infusion and removal the combined thermosetting resin and polyurethane structure alloy has a weight if cured of up to about 6 times the weight of the polyurethane structure alone.

Preferably furfuryl alcohol containing a catalyst is used for the infusion as the furan resin precursor to provide for ease of removal of excess liquid from the surfaces of the strands. Furfuryl alcohol is a low viscosity liquid and is thus more easily infused and the excess is more easily removed than the more viscous liquid resins. The longer carbonization cycles described in U.S. Pat. No. 3,446,593 to Moutaud or in U.S. Pat. No. 3,922,334 to Marek can be used in the carbonization; however, they are unnecessary, uneconomic and wasteful of energy. The thermosetting liquid phenolic resins in solution in solvents which infuse polyurethane resins of these prior art patents can also be used for the infusion; however, they are not preferred because of the substantial shrinkage which is encountered during carbonization. Other liquid thermosetting resins or resin precursors which will alloy with polyurethane resins can also be used, however, they are not preferred.

Once the compressed reticulated polyurethane structure is infused with the liquid thermosetting resin or resin solution or resin precursor and the excess removed (with or without curing), it is carbonized to form the reticulated anisotropic product, usually in 5 hours or less from the time carbonization begins, which is considered to be at about 400° C. If an "active carbon" is to be formed, the carbonization temperature used is usually about 400° to about 800° C which leaves ultra microporosity in the individual bent strands. Above about 800° C a progressively more chemically and physically inert form of carbon is formed as is known to those skilled in the art. Temperatures up to 3000° C can be used for the carbonization as is known to those skilled in the art. Generally speaking the carbon formed by the method of this invention is regarded as being "vitreous".

Figure 2:
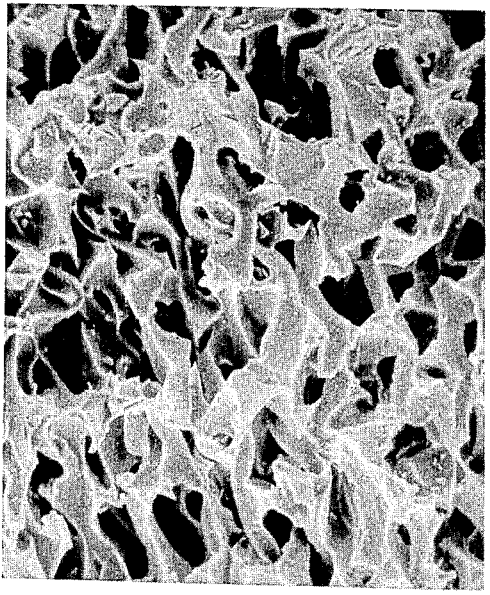
FIG. 2 is a 100 times scanning electron micrograph of a thin cross-section of the anisotropic reticulated bent strand carbon structures of the present invention, particularly illustrating substantial interbonding of the carbon strands due to a 10:1 compression.

Anisotropic reticulated carbon products of the present invention such as illustrated in FIGS. 2 to 4 have a conductivity perpendicular to the direction of compression of about 0.114 ohm-cm for a product which was compressed to one-fifth (5:1) the original uninfused reticulated polyurethane structure dimension in one plane. For a one-seventh-and-a-half (7.5:1) compression, the conductivity was about 0.081 ohm-cm. The infused compressed products were fired up to 1000° C over a period of about 6 to 8 hours to accomplish carbonization. The products tested were prepared from an infused reticulated uncompressed polyurethane structure which had an initial uninfused density of about 1.8 pounds per cubic foot (pcf) and had about 100 ppi (0.029 gm/cc; 39.4 pores per centimeter utilizing a conventional air passage test for porosity). The 5 times and 7.5 times compressed carbon structures had bulk densities of 17 pcf (0.27 gm/cc) and 24 pcf (0.38 gm/cc) respectively. The electrical conductivity for the anisotropic reticulated carbon products was found to be greater than might have been estimated based upon conductivity gain as a function of compression (density), as the uncompressed reticulated carbon structure made from the same parent polyurethane had a density of 3.2 pcf (0.05 gm/cc) and a conductivity of only about 0.886 ohm-cm.

SPECIFIC DESCRIPTION

The following Examples I to III illustrate the present invention. The products in Examples I and II were made from thermally reticulated polyurethane structures which were set in the compressed state before infusion according to the teaching of U.S. Pat. No. 3,325,338. Example III illustrates a preferred method.

EXAMPLE I

The phenolic resin product used for infusion in this Example was Reichhold Chemicals Inc. 29–302 Varcum$_{t.m.}$, a two-stage dry powdered phenolic resin which contained hexamethylenetetramine as a curing agent. The resin had the properties shown in Table I.

TABLE I

| Color | Cream |
|---|---|
| Hexamethylenetetramine Content, % | 9.1 |
| Softening Point (Capillary), ° C | 80 |
| Inclined Plate Flow at 125° C, mm | 43 |
| Hot Plate Cure at 150° C., sec. | 84 |
| Screen Analysis (U.S. Std.), % (:) | |
| on 70 mesh | 0.010 |
| on 100 mesh | 0.095 |
| on 200 mesh | 1,325 |

The compressed reticulated polyurethane structures were infused with a solvent solution of the phenolic resin, where the solvent infuses into the solid polyurethane polymer and acts as a carrier for the phenolic resin to take it into the urethane strands. The infusing solution was made by dissolving 50 grams of the 29–302 Varcum$_{t.m.}$ powder in 200 grams of tetrahydrofuran (THF) solvent. This solution was within the concentration range listed in U.S. Pat. No. 3,922,334. The compressed samples infused very readily with this solution and the excess resin solution was removed by squeezing.

The phenolic resin infused anisotropic reticulated polyurethane structures were first cured for 16 hours in air at 150° C, then placed in a retort between graphite plates to help maintain dimensional stability and carbonized according to the following schedule: Heated in a non-oxidizing environment for one hour at 250° C; raised to 600° C at the rate of 100° C per hour; and raised to 1000° C at 300° C per hour.

The following Table II shows the data on the anisotropic reticulated vitreous carbon products produced.

TABLE II

| Porosity ppi (1) | Compression Ratio (2) | Dry Bulk Density pcf (gm/cc) | Dry Weight grams | Dry Dimensions cm | Cured Weight grams |
|---|---|---|---|---|---|
| 80 | 3:1 | 5.2 (0.08) | | 5.08×5.08×2.54 | 8.19 |
| 80 | 5:1 | 8.2 (0.131) | 8.6 | " | 12.12 |
| 80 | 10:1 | 15.7 (0.251) | 16.5 | " | 25.54 |
| 100 | 5:1 | 18.8 (0.300) | 19.8 | " | 28.93 |

| Cured Dimensions cm | Carbonized Weight Grams | Carbonized Dimensions cm | Nominal Bulk Carbonized Density pcf (gm/cc) |
|---|---|---|---|
| 5.33 × 5.59 × 2.79 | 3.02 | 4.06 × 3.86 × 2.03 | 6 (0.096) |
| 5.33 × 5.33 × 2.79 | 4.17 | 3.81 × 3.68 × 2.03 | 9 (0.144) |
| 5.33 × 5.59 × 2.92 | 9.26 | 3.68 × 3.68 × 1.90 | 22 (0.352) |
| 5.46 × 5.46 × 2.79 | 8.83 | 4.19 × 4.27 × 1.98 | 16 (0.256) |

(1) The 80 ppi products were all made from a nominal 1.8 pound per cubic foot (0.0288 gm/cc) polyester polyurethane reticulate structure compressed linearly to the indicated ratios between heated platens in the manner of U.S. Pat. No. 3,325,338 to Geen. The 100 ppi product was made from a nominal 4 pound per cubic foot (0.064 gm/cc) reticulated polyurethane structure and similarly compressed. To convert "ppi" to pores per centimeters, divide by 2.54.
(2) Compressed in one plane to reduce the height in the indicated ratios.

The products of Example I were considerably reduced in volume over the initial compressed uninfused reticulated polyurethane structures (about half) which is a disadvantage. This is believed to be because the THF necessarily comprises the major portion of the infused volume of liquid and it volatilizes upon heating and thus there is a relatively small amount of non-fugitive carbon available from the relatively small volume of infused phenolic resin. In order to improve this result, the furanic resins are preferred, since the liquid resin or resin precursor does not require a fugitive solvent and is not fugitive per se so upon infusion they are completely available for conversion to the solid furanic polymer and ultimately for carbonization as shown in Example II.

EXAMPLE II

Using furfuryl alcohol (FA) catalyzed with 4 parts of methyl paratoluene sulfonate by weight to 100 parts by weight of FA, the compressed anisotropic reticulated polyurethane structures were infused with the mixture in the fashion described in the U.S. Pat. No. 3,927,186 and the excess was removed by squeezing. The wet infused samples were placed in a retort between graphite plates and carbonized in non-oxidizing environment according to the following schedule: heated for one hour at 200° C; raised to 600° C at the rate of 100° C per hour; and raised to 1000° C at the rate of 300° C per hour.

The following Table III gives the data on these furan resin (via furfuryl alcohol) infused reticulated anisotropic vitreous carbon products.

TABLE III$_{(1)}$

| Porosity ppi | Compression Ratio | Dry Bulk Density pcf (gm/cc) | Nominal Carbonized Bulk Density pcf (gm/cc) |
|---|---|---|---|
| 80 | 3:1 | 5.2 (0.08) | 11 (0.18) |
| 80 | 5:1 | 8.2 (0.13) | 17 (0.27) |
| 80 | 10:1 | 15.7 (0.25) | Cracked, indeterminable |
| 100 | 10:1 | 39.0 (0.62) | Sample not fully infused |

$_{(1)}$See the footnotes to Table II

The 80 and 100 ppi reticulate structures in the Table above are duplicates of the corresponding reticulate structures shown in Table I with the exception that the 4 pcf (0.064 gm/cc) structure was compressed 10:1 and as a result it was so dense that it could not be infused with the FA mixture. The preparation of the 10:1 80 ppi compression ratio structure was essentially repeated using 2 parts per hundred of methyl paratoluenesulfonate (MPTS) in furfuryl alcohol and produced the uncracked product of FIG. 2. Likewise the product of FIG. 3 was made with 2 parts MPTS per hundred parts of FA and had a density of 0.2 gm/cc.

The dimensions of the carbon structures made with FA were approximately as large as the original dry non-infused polyurethane reticulate structure dimensions. This is an advantage where there is a necessity to retain the approximate compressed reticulate polyurethane structure dimensions in the carbon product. The phenolic derived carbon structures are considerably smaller than the original dry polyurethane reticulate structure dimensions. As previously indicated, this greater shrinkage is probably because of the necessarily low concentration of the active carbonizable ingredient (phenolic) in the porous product compared to the solvent-free and non-fugitive and carbonizable furan resin precursor furfuryl alcohol in Example II. The THF-phenolic solution was found to have one advantage in that the microporous structure infused very quickly, noticeably quicker than FA at the same temperature.

In the procedure of Example II, the catalyzed FA was cured in the infused polyurethane structure in conjunction with firing; however the infused structure can be cured before carbonization.

The products of the present invention can be prepared by several methods including that of U.S. Pat. No. 3,927,186. For reasons of speed and economy, one preferred method of the present invention is shown by the following Example III.

EXAMPLE III

An uncompressed 4 inch (10.2 cm) cube of 100 ppi reticulated polyester polyurethane structure was used as a starting material. The structure weighed 31 grams and had a density of about 1.8 pcf (0.029 gm/cc).

The structure was infused with furfuryl alcohol (FA) containing 3 parts per hundred parts of FA of 26° Baume' aqueous ammonia solution; 3 parts p-toluene sulfonic acid, and 1.5 parts water. The ammonia reacted with the acid to form a latent catalyst which effects the cure when heated because of dissociation at elevated temperatures. The infused cube weighed 157 gms after removal of the excess FA mixture and swelled to a cube which had dimensions of about 6¼ inches (15.9 cm) on a side. Excess FA was removed by squeezing.

The uncured infused cube was placed between carbon plates and compressed so that it was 1½ inch (3.8 cm) thick and the plates were fixed in position. The assembly or sandwich of plates and compressed structure was placed in a furnace with an argon atmosphere. The furnace was held at 150° C for 1 hour to initiate cure of the FA. The temperature was then raised at a rate of 100° C per hour until it reached 600° C. Carbonization is believed to have begun at about 400° C. The temperature was then raised to 1000° C in 1 hour and held at this temperature for 60 minutes.

After firing the retort was removed from the furnace cooled to room temperature and the product removed. The reticulated anisotropic vitreous carbon product weighed 53 gms, was 1¼ inch thick (3.2 cm); 4 inches wide (10.2 cm) and 4 5/8 inches long (11.7 cm). The produce was crack-free and is shown in FIG. 4.

The use of reversible neutralizing agents such as ammonia or amines for the acid catalysts is particularly beneficial. Ammonia is preferred for reasons of economy and ease of removal.

As can be seen, the direct compression and firing method is simpler because it eliminates the step of compression setting of the reticulate structure before infusion. Removal of excess liquid resin or resin solution or resin precursor is easily accomplished from the uncompressed flexible reticulated polyurethane structure.

A 100 ppi anisotropic reticulate structure, prepared as described in Example III as shown in FIG. 4, which was compressed in a ratio of 3.2:1, had a compressive strength in the direction of compression of about 80 psi and in a plane perpendicular to the direction of compression of 300 psi. The comparative isotropic reticulated structure as illustrated in FIG. 5 had a compressive strength of about 43 psi. Thus the anisotropic structures had a significantly increased (7 times) compressive strength in the plane perpendicular to the direction of compression.

We claim:

1. The carbon structure which comprises:
   a crack-free, reticulated porous anisotropic carbon structure of interconnected and continuous strands which is derived from and which reproduces upon carbonization the isomorphic form of a compressed reticulated flexible polyurethane structure without cell membranes which has been infused with a liquid thermosetting resin or resin precursor or resin solution which alloys with the polyurethane and wherein the structure is substantially free of a non-alloyed surface coating of the resin or resin precursor or resin solution prior to carbonization and wherein the carbonization has been achieved with the infused polyurethane structure maintained in a compressed condition of at least fifty percent of its original dimension before or after infusion in at least one plane.

2. The structure of claim 1 wherein the polyurethane structure has been thermally reticulated and then compressed with heating to interbond the strands prior to carbonization.

3. The structure of claim 1 wherein the thermosetting resin is selected from a phenolic resin in a solvent or a furan resin or a furan resin precursor.

4. The structure of claim 1 wherein an uncompressed reticulated polyurethane structure has been infused with the liquid thermosetting resin, compressed and then fired to form the anisotropic carbon product.

5. The structure of claim 1 in the form of vitreous carbon.

6. The structure of claim 1 wherein the carbonized structure is derived from a furan resin or furan resin precursor.

7. The structure of claim 1 wherein the cured thermosetting resin infused polyurethane structure prior to carbonization weights up to about six times the weight of the non-infused polyurethane structure alone.

8. The anisotropic reticulated carbon structure comprised of interconnected and continuous bent strands of carbon in the isomorphic form of a compressed flexible reticulated polyurethane structure infused with a thermoset or thermosettable resin, from which the carbon structure is derived by carbonization, said polyurethane structure being compressed at least fifty percent of its original dimension before or after infusion in at least one plane.

9. The structure of claim 8 wherein the compression bent carbon strands are interbonded.

10. In the method of forming a carbon structure by carbonization of a reticulated polyurethane structure of interconnected and continuous strands which has been infused with a liquid thermosetting resin or resin precursor or resin solution to form an alloy and then excess surface coating of the thermosetting resin or resin precursor or resin solution is removed prior to curing and carbonization, the improvement which comprises:
   a. providing the infused polyurethane structure in a compressed condition of at least fifty percent of its original dimension before or after infusion in at least one plane; and b. carbonizing the infused polyurethane structure either in conjunction with or after curing of the thermosetting resin, resin precursor or resin solution with the infused polyurethane structure maintained in said compressed condition.

11. The method of claim 10 wherein the compressed structure is subjected to the carbonization procedure in conjunction with curing of the liquid thermosetting resin or resin precursor or resin solution.

12. The method of claim 10 wherein the thermosetting resin or resin precursor or resin solution in the infused polyurethane structure is cured prior to carbonization.

13. The method of claim 10 wherein the carbon strands are interbonded as a result of the compression and carbonization.

14. The method of claim 10 wherein the reticulated structure is isotropic prior to infusion and then is compressed.

* * * * *

UNITED STATES PATENT AND TRADEMARK OFFICE
CERTIFICATE OF CORRECTION

PATENT NO. : 4,067,956
DATED : 1978 January 10
INVENTOR(S) : Charles H. Franklin, Clarence S. Vinton and Henry C. Geen It is certified that error appears in the above-identified patent and that said Letters Patent are hereby corrected as shown below:

Column 1, line 61, "spacing" should be --spacings--.

Column 3, line 20 "form" should be --foam--.

Column 3, line 24 "stand" should be --strand--.

Column 6, line 34 insert --a-- before "non-oxidizing".

Column 7, line 10 "furfurly" should be --furfuryl--.

Column 8, line 46, "weights" should be --weighs--.

Signed and Sealed this

Eleventh Day of July 1978

[SEAL]

Attest:

RUTH C. MASON
Attesting Officer

DONALD W. BANNER
Commissioner of Patents and Trademarks